United States Patent
Willis et al.

(10) Patent No.: US 7,153,793 B2
(45) Date of Patent: Dec. 26, 2006

(54) MULTILAYER NONWOVENS INCORPORATING DIFFERENTIAL CROSS-SECTIONS

(75) Inventors: Edward Keith Willis, Madison, TN (US); Harry Barnes, Brentwood, TN (US); John Frank Baker, Jr., Nashville, TN (US)

(73) Assignee: Reemay, Inc., Old Hickory, TN (US)

( * ) Notice: Subject to any disclaimer, the term of this patent is extended or adjusted under 35 U.S.C. 154(b) by 56 days.

(21) Appl. No.: 10/725,222

(22) Filed: Dec. 1, 2003

(65) Prior Publication Data

US 2004/0147194 A1 Jul. 29, 2004

Related U.S. Application Data

(60) Provisional application No. 60/430,427, filed on Dec. 2, 2002.

(51) Int. Cl.
*D04H 1/00* (2006.01)
*D04H 13/00* (2006.01)
*D04H 3/00* (2006.01)
*D04H 5/00* (2006.01)

(52) U.S. Cl. ............... 442/337; 442/335; 442/338; 442/381; 442/382; 442/389; 442/401; 442/415

(58) Field of Classification Search ............... 442/381, 442/382, 335, 337, 338, 401, 415, 389
See application file for complete search history.

(56) References Cited

U.S. PATENT DOCUMENTS

| | | | | | |
|---|---|---|---|---|---|
| 4,778,460 | A | * | 10/1988 | Braun et al. | 604/380 |
| 4,908,052 | A | * | 3/1990 | Largman et al. | 55/486 |
| 5,057,368 | A | * | 10/1991 | Largman et al. | 428/397 |
| 5,397,632 | A | * | 3/1995 | Murphy et al. | 442/358 |
| 5,707,735 | A | | 1/1998 | Midkiff et al. | |
| 5,820,645 | A | | 10/1998 | Murphy, Jr. | |
| 6,509,285 | B1 | * | 1/2003 | Yeh | 442/195 |
| 6,613,704 | B1 | * | 9/2003 | Arnold et al. | 442/361 |
| 6,649,547 | B1 | * | 11/2003 | Arnold et al. | 442/345 |
| 6,815,383 | B1 | * | 11/2004 | Arnold | 442/362 |

FOREIGN PATENT DOCUMENTS

| | | | |
|---|---|---|---|
| WO | WO 00/15891 | * | 3/2000 |
| WO | WO 01/90464 A | | 11/2001 |

* cited by examiner

*Primary Examiner*—Norca Torres
(74) *Attorney, Agent, or Firm*—Alston & Bird LLP

(57) ABSTRACT

Nonwoven fabric fabrics suitable for undergoing pleating to form filtration media are provided. The fabrics generally include at least three layers. The fibers forming the inner layer has a cross section providing greater stiffness, while the fibers forming the outer layers have a cross section providing greater durability. The resulting fabrics provide improved particulate holding and pressure drop characteristics at no sacrifice to durability.

14 Claims, 3 Drawing Sheets

MULTILAYER NONWOVENS INCORPORATING DIFFERENTIAL CROSS-SECTIONS

CROSS-REFERENCE TO RELATED APPLICATION

This application claims priority from U.S. Provisional Patent Application 60/430,427 filed Dec. 2, 2002, which is incorporated herein by reference.

FIELD OF THE INVENTION

The present invention is directed to nonwoven fabrics suitable for use as filtration media. The present invention is more specifically directed to nonwoven fabrics suitable for use as pleated filtration media.

BACKGROUND OF THE INVENTION

Various kinds of filters utilize nonwoven fabrics as filtration media. Nonwoven fabric materials are frequently used, for example, for automotive air filters, where it is important to remove airborne particles which may be suspended in the combustion air supplied to the automobile engine. In addition to their particulate holding abilities, filters beneficially allow high volumes of air to readily pass through. Consequently, filters are advantageously further characterized by high air permeabilities and low pressure drops. It has been heretofore been generally understood that improvements in particulate holding properties, i.e. the ability to trap solids, are typically made at the sacrifice of pressure drop and/or air permeability, i.e. the ability to allow gases to readily pass through.

Nevertheless, a number of effective air filtration products are known. For example, U.S. Pat. No. 5,397,632 to Murphy, Jr. et al., describes a nonwoven laminated composite article which is capable of undergoing pleating to form a stable pleated gas filtration medium. The pleating procedure provides the filtration medium with a three-dimensional area, thereby increasing its surface area. The filtration medium is a three layered composite nonwoven material which is needle punched to mechanically interconnect and interlock through entanglement of fibers and filaments the various webs forming the composite laminate material. These nonwoven layers include a fully bonded, air permeable, high loft polyester batt, an intermediate web of a substantially unbonded, air permeable continuous filament polyester web, and an outer backside web formed of random continuous filaments which are substantially fully bonded.

Another example of a composite laminate filter material used for particle removal from fluids is U.S. Pat. No. 5,283,106 to Seiler et al. This patent is directed to a multilayered filter specifically for dust collection from gases which includes the combination of two nonwovens to form a laminate material. The multilayer filter material can include a polyethylene terephthalate spunbonded web layer serving as a depth filter and a second fine filter joined to the depth filter by adhesive or welding. The depth filter has a basis weight of from 150 to 500 g/m², and the filaments have a denier between 4 and 20 dtex. The fine filter has a basis weight of from 30 to 100 g/m² and the filament denier between 1 and 6 dtex. The webs are subjected to a consolidating treatment such as calendering or needling or thermal bonding using binders.

Although a variety of pleated filters are known, a need remains in the art for filters providing improved particulate removal, particularly improved particulate removal values at higher air permeabilities and lower pressure drops.

SUMMARY OF THE INVENTION

It is also an object of the present invention to provide a filter medium exhibiting excellent particulate removal, along with improved pressure drop and air permeability.

It is a further object of the present invention to provide a filter medium which is pleatable.

The present invention achieves these and other objects and advantages by providing a nonwoven fabric comprising a first air permeable nonwoven layer comprised of fibers having a first non-circular cross section; and a second air permeable nonwoven layer adjacent said first layer and comprised of fibers having a second non-circular cross section which is different from said first non-circular cross section.

BRIEF DESCRIPTION OF THE DRAWINGS

The foregoing and other objects, features, and advantages of the present invention will be made apparent from the following detailed description of the invention and from the drawings, in which.

DETAILED DESCRIPTION OF THE DRAWINGS

The present invention will now be described more fully in detail with reference to the accompanying drawings, in which preferred embodiments of the invention are shown. This invention should not, however, be construed as limited to the embodiments set forth herein; rather, they are provided so that this disclosure will be thorough and complete and will fully convey the scope of the invention to those skilled in the art.

The present invention provides a composite nonwoven fabric suitable for undergoing pleating to form a pleat support in liquid or air filtration applications. The composite nonwoven fabric is formed from at least three nonwoven layers or plies that are joined in a surface to surface relationship. Each layer or ply is formed of fibers that are arranged to form a nonwoven web. Unless the context dictates otherwise, the term "fiber" or "fibers" is used herein as a generic term to refer to the constituent strands of the nonwoven fabric. The fibers may be of discrete length, such as staple fibers, or they may be of indeterminate length, such as continuous filament fibers. The composite nonwoven fabric provides pleat supports exhibiting higher stiffness, lower pressure drop and higher dust holding capacity than heretofore available.

Figure 1:
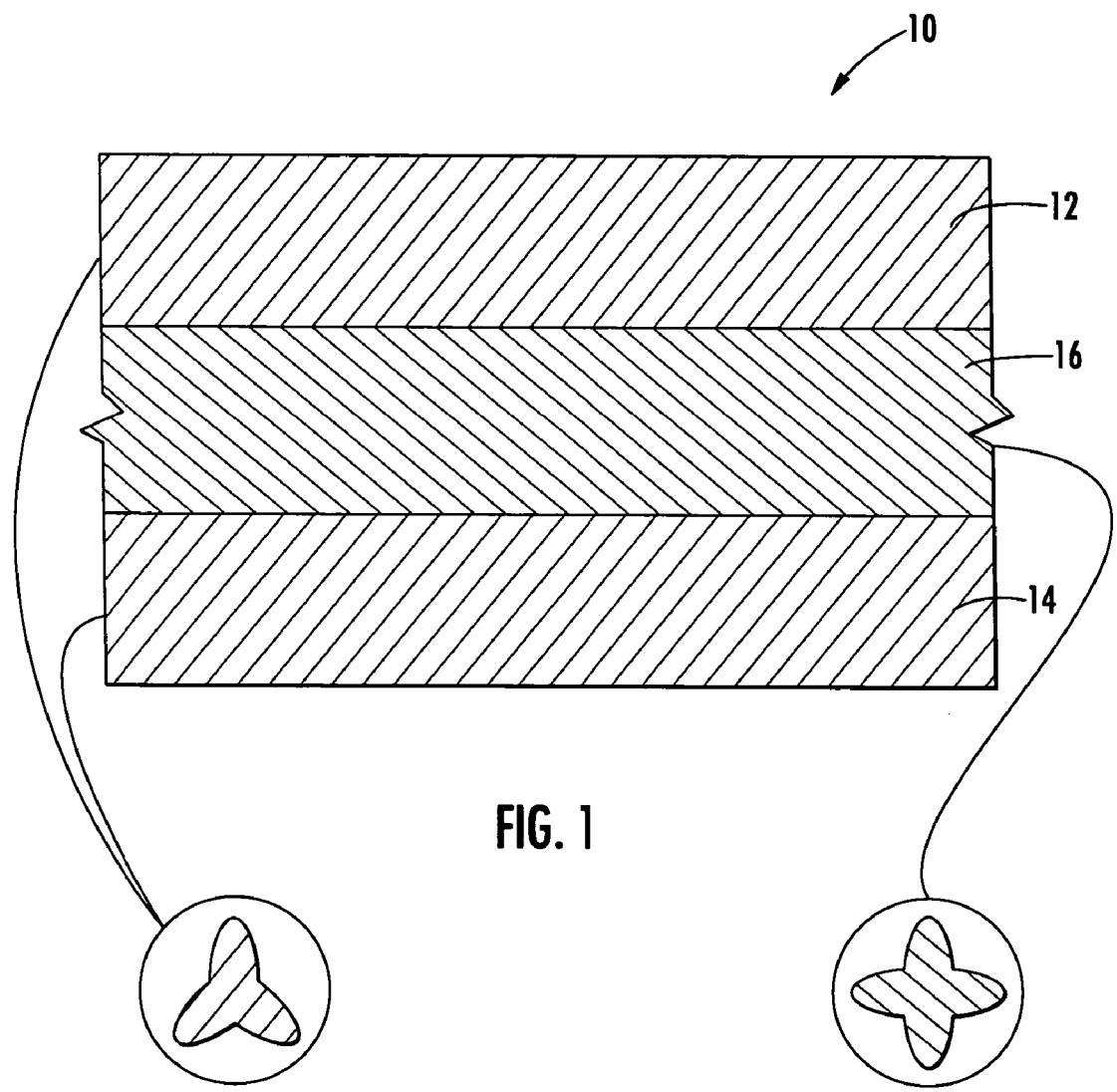
FIG. 1 is a schematic illustration of an enlarged cross-sectional view of an exemplary nonwoven fabric in accordance with the invention.

Referring to FIG. 1, the pleatable fabric of the present invention is indicated generally by the reference character 10. The fabric generally includes first and second air permeable outer nonwoven web layers 12, 14 sandwiching at least one air permeable inner (or intermediate) nonwoven layer 16.

The outer layers 12, 14 and the intermediate layer or layers 16 are nonwoven webs formed by any of a number of processes known in the nonwovens industry. For example, the first and second outer layers 12, 14 may be spunbond nonwoven webs formed of continuous filaments by the well-known spunbond process, or the layers 12, 14 may be formed from staple fibers by various processes such as carding, air-laying, wet-laying, etc. In preferred embodiments, the first and second outer layers 12, 14 are a spunbonded nonwoven and the filaments thereof are randomly deposited to give the web isotropic properties that are nondirectional in nature. Likewise the inner or intermediate layer or layers 16 may comprise one or more nonwoven webs of continuous filaments or staple fibers produced by conventional nonwoven manufacturing processes. In preferred embodiments, the intermediate layer or layers 16, as well as the outer layers 12, 14 are spunbond nonwoven webs.

The fibers of the nonwoven layers 12, 14, 16 may be formed from any of a number of known fiber-forming thermoplastic polymer compositions. For example, the fibers may be formed from polyester, polyamide, polyolefin, polyurethane or mixtures or copolymers thereof. An exemplary advantageous polyester is polyethylene terephthalate. Exemplary advantageous polyamides include nylon 6 and nylon 6,6. Exemplary polyolefins include polypropylene and polyethylene. Exemplary polyurethanes include polyester based polyurethanes and polyether based polyurethanes. In advantageous embodiments that are suitable for high temperature applications, the fibers are formed from polyethylene terephthalate.

The fibers of the outer layers 12, 14 and of the intermediate layer or layers 16 typically have a size or linear density of about 3 to about 24 denier per filament ("dpf") (about 3 to about 27 dtex), such as from about 6 to about 18 dpf (about 7 to about 20 dtex). In preferred embodiments, the fibers of the first and second outer layers 12, 14 have a fineness of about 12 dpf (13 dtex). In alternative beneficial embodiments, the fibers of the first and second outer layers 12, 14 have a fineness of about 6 dpf or a mixture of 6 and 12 dpf fibers is employed.

The fibers of the outer layers 12, 14 and of the intermediate layer or layers 16 are bonded to each other at points of contact, but the nonwoven structure remains sufficiently open to provide the requisite air permeability. Preferably, the layers are substantially fully bonded, with the fibers being bonded together at a plurality of crossover points throughout the fabric. This type of bonding, commonly referred to as "area bonding", is different from "point bonding" where the fibers are bonded to one another at discrete spaced apart bond sites, usually produced by a patterned or engraved roll. The bonding of the fibers within each layer can be independently accomplished by any of a number of known means, such as by the melting of binder fibers, resin bonding, thermal area bonding, calendering, point bonding, ultrasonic bonding, etc. In certain preferred embodiments of the present invention, each layer of the composite fabric 10 is bonded by binder fibers having a lower melting temperature than the primary fibers of the nonwoven layer. The binder fibers may be included within the layer in an amount effective to induce an adequate level of inter-fiber bonding within the nonwoven layer. The binder fibers may also serve to bond the respective layers to one another to form an integral, strong composite fabric 10 that is not subject to delamination.

The binder fibers are typically present in the respective layers in amounts ranging independently from about 2 to 20 weight percent, such as an amount of about 10 weight percent. They are preferably formed from a thermoplastic polymer exhibiting a melting or softening temperature at least about 10° C. lower than the durable fiber. Exemplary binder fiber may be formed from either a low melting polyolefin polymer or a low melting polyester polymer or copolymers or mixtures thereof. In one beneficial embodiment where the primary fibers of the nonwoven are polyester, such as polyethylene terephthalate, the binder fiber is formed from a lower melting polyester copolymer, particularly polyethylene isophthalate. The optional binder fibers used for bonding the layers be of various cross-sections, including round and trilobal cross sections, and may have various sizes or diameters. Moreover, it will be understood that although the binder fibers are incorporated into the nonwoven web layers during manufacture, in many instances, the binder fibers may not be separately identifiable in the nonwoven layers after bonding because the binder fibers have softened or flowed to form bonds with the other fibers of the nonwoven layers. One advantage of using binder fibers for bonding the layers is that there is no added chemical binder present in the nonwoven layers.

The first and second air permeable outer layers 12, 14 are generally formed from one or more durable fibers. As used herein, the term "durable fibers" indicates fibers having cross sections exhibiting a higher resistance to peripheral damage, e.g. splitting or pilling, in comparison to the fibers within the inner layer 16. The durable fibers within the first and second layers 12, 14 may have any cross section known in the art which is understood to generally retard or inhibit fiber separation. By using non-circular cross-section fibers in at least one of the outer layers 12, 14, the fiber surface area can be increased, thus allowing for increasing the filtration efficiency for a given basis weight, or allowing for using a reduced basis weight while maintaining comparable filtration efficiency. Exemplary durable fiber cross sections include various trilobal configurations, such as Y or T shaped fibers having various dimensional relationships or modification ratios. Trilobal fibers in accordance with the invention may further be either hollow or solid.

The first and second outer layers 12, 14 may each be formed from durable fibers having the same or differing cross sections. A mixture of durable fibers of differing cross section may be included within either the first and/or second outer layers 12, 14, as well. In one aspect of the invention, both of the first and second outer layers 12, 14 are formed from durable fibers having a trilobal cross section, such as the cross-section indicated within the insert in FIG. 1.

As used herein the term "formed from one or more durable fibers" is used to mean that the layer contains a substantial amount of durable fibers, such as at least a majority of durable fibers by weight. The term "formed from one or more durable fibers" is not meant to exclude a mixture of the given fiber with other fibers. Consequently, the outer layers 12, 14 may each independently contain durable fiber in amounts ranging from about 70 to 100 weight percent, based on the weight of the layer, such as an amount ranging from about 90 to 100 weight percent.

The inner layer 16 is generally formed from one or more stiff fibers. As used herein, the term "stiff fibers" refers to fibers having cross sections exhibiting a greater stiffness in comparison to the fibers within either the first or second outer layers 12, 14. The stiff fibers within the inner layer 16 may have any cross section known in the art to provide enhanced stiffness in comparison to the cross section employed to form the first and second outer layers 12, 14. Exemplary stiff fiber cross sections include any non-circular fibers defining four or more lobes, i.e. quadralobal (cross-shaped), pentalobal and the like, having any suitable modification ratio or dimensional relationship. In alternative embodiments, the greater stiffness within the stiff fiber may be imparted through the use of a rectangular shape, such as a ribbon shaped fiber and the like.

The inner layer 16 may be formed from stiff fiber having a single cross sectional configuration. Alternatively, the stiff fibers within the inner layer 16 may define a mixture of cross sectional configurations. In one aspect of the invention, the inner layer 16 is formed from stiff fibers having a quadralobal cross section, such as the cross-section indicated within the insert in FIG. 1.

As used herein the term "formed from one or more stiff fibers" is used to mean that the layer contains a substantial amount of stiff fibers, such as at least a majority of stiff fibers by weight. The term "formed from one or more stiff fibers" is not meant to exclude a mixture of the stiff fibers with other fibers. Consequently, the inner layer 16 may contain stiff fiber in amounts ranging from about 70 to 100 weight percent, based on the weight of the layer, such as an amount ranging from about 90 to 100 weight percent.

In alternative beneficial embodiments, more than one middle layer 16 is included within the nonwoven fabric 10. In such embodiments, each of the additional interior layers may be formed from the same or different stiff fibers using the methods and materials described above. In one such exemplary embodiment, the nonwoven fabric 10 includes two inner layers formed in accordance with the description above. In one beneficial aspect of such embodiments, both of the inner layers are formed from 12 denier quadralobal filaments, such as 12 denier quadralobal polyethylene terephthalate filaments.

In further alternative aspects, a plurality of inner layers may be provided to produce a gradient filter. For example, a nonwoven fabric 10 incorporating respective layers formed from 2, 4, 6 and 12 dpf fibers may be produced.

In aspects of the invention providing more than one middle layer, the nonwoven fabric 10 may further include one or more transition layers as the additional middle layer(s). Such transitional layers would include a mixture of durable and stiff fibers. For example, the invention may include a transitional layer including 55%–70% durable fibers and 30%–45% of stiff fibers.

The nonwoven fabric 10 generally has a thickness of approximately 15 to 25 mils (0.38 to 0.64 mm) and a basis weight of approximately 0.2 to 8.0 oz./square yard (6.8 to 271 g/m$^2$), such as a basis weight ranging from about 0.5 to 4.0 oz./square yard (17 to 136 g/m$^2$). The nonwoven fabrics of the invention generally provide adequate stiffness and shape retention properties needed for pleating.

If the nonwoven fabric 10 does not have adequate stiffness in its originally manufactured state, a stiffening coating (not shown) may be applied to one or both surfaces of the nonwoven fabric 10. More particularly, at least one of the outer layers 12, 14 may be provided with a resin coating for imparting additional stiffness to the nonwoven fabric 10 so that the fabric may be pleated by conventional pleating equipment. By varying the amount of resin coating applied to the outer layer 12 or 14, the air permeability of the nonwoven fabric 10 may also be controlled as required for specific filtration applications. The resin coating may be applied to the nonwoven fabric 10 using conventional coating techniques such as spraying, knife coating, reverse roll coating, or the like. Exemplary resins include acrylic resin, polyesters, nylons or the like. The resin may be supplied in the form of an aqueous or solvent-based high viscosity liquid or paste, applied to the nonwoven fabric 10, e.g. by knife coating, and then dried by heating.

Either additionally or alternatively, a light resin coating may also be applied to at least one of the outer surfaces of the nonwoven fabric 10 to provide fiber tie-down, improve abrasion resistance, and thus minimize fuzzing of the surface. Light resin coating compositions and techniques which are suitable for use in the present invention are described in commonly-owned U.S. Pat. No. 5,397,632, the disclosure of which is incorporated herein by reference.

Figure 2:
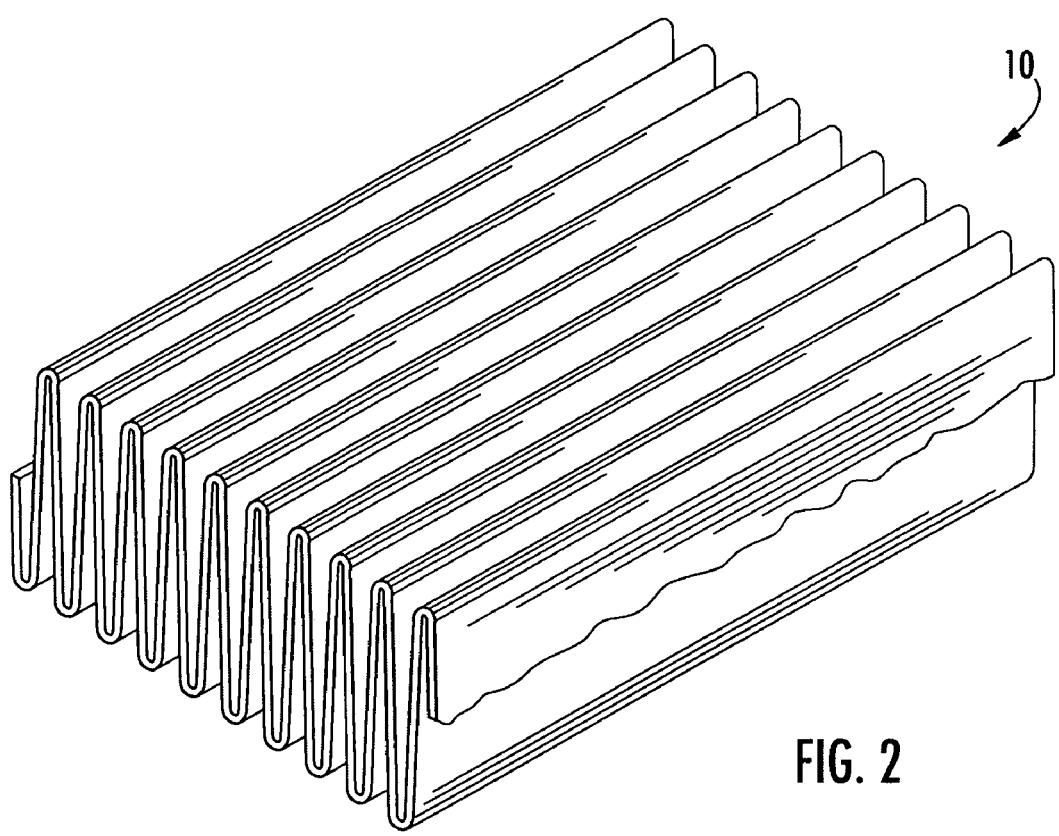
FIG. 2 is a schematic perspective view of a portion of a pleated filtration media formed from the nonwoven fabric according to the present invention.

The nonwoven fabric 10 may be used directly in filtration applications as a flat fabric. In alternative advantageous embodiments, the nonwoven fabric 10 may be pleated as illustrated in FIG. 2, and used alone or as a pleat support along with additional layers. The pleated fabric includes substantially U-shaped undulations which were created while passing at a rate 10 to 15 feet per minute through a conventional pleater apparatus, such as a Chandler pleater. The pleating is advantageously carried out without any substantial modification of the air permeability of the material.

The nonwoven fabric 10 may be formed by means known in the art for providing layered nonwoven structures. In one preferred embodiment, the nonwoven fabric 10 is formed on a single spunbond manufacturing line equipped with a plurality of spunbonding beams, each of which deposits a nonwoven layer of filaments of a particular cross-section and size, along with binder filaments. The respective layers are subsequently directed through a heated bonding apparatus that heats the fabric to the point that the binder fibers become adhesive, thus serving to bond the fibers of each layer, and the respective layers, to one another. It is also possible to form each of the outer layers 12, 14 and inner layer 16 separately, and to subsequently laminate the various layers using thermal bonding and/or adhesives.

Figure 3:
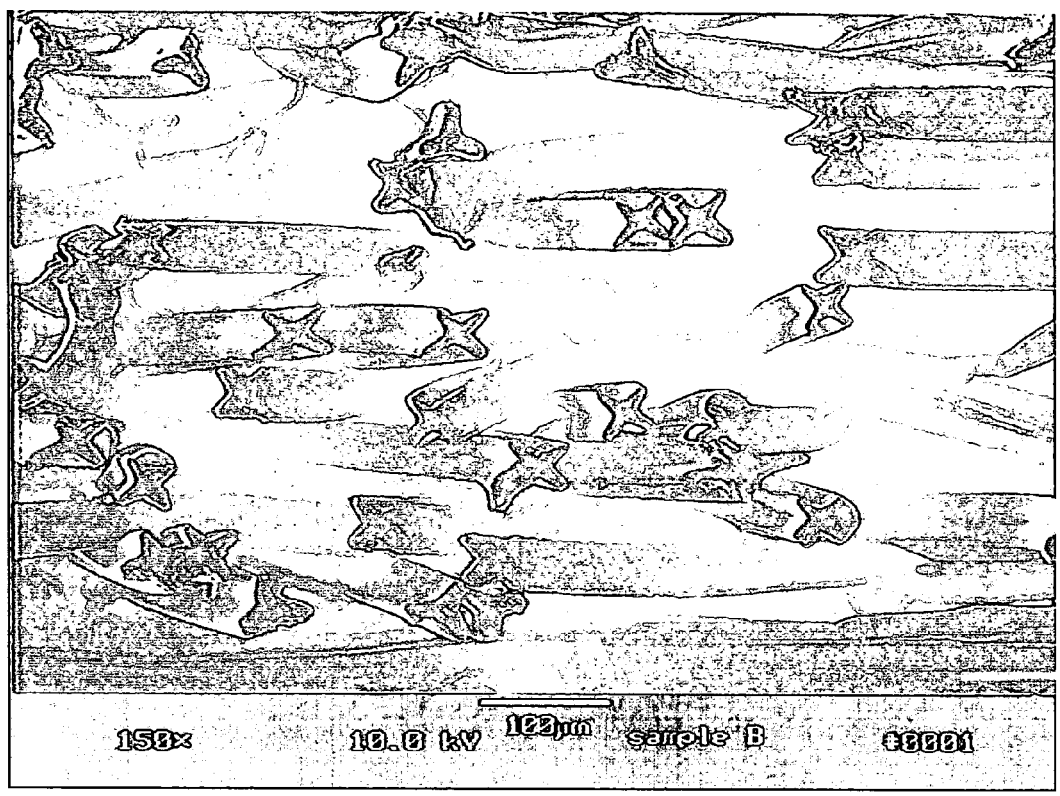
FIG. 3 is a photomicrograph of a cross-sectional view of an exemplary nonwoven fabric formed in accordance with the invention.

FIG. 3 provides a photomicrograph of a preferred embodiment of the nonwoven fabric 10. As shown in FIG. 3, the nonwoven fabric 10 includes outer layers formed from fibers having a trilobal cross section and an inner layer formed from fibers having a quadralobal cross section. The fabric illustrated in FIG. 3 is a spunbonded nonwoven formed from polyethylene terephthalate. The inner layer and outer layers are advantageously formed from 12 dpf filament. Alternatively, the inner layer may be formed from 12 dpf filament and the outer layers formed from 6 dpf filament.

Nonwoven fabrics formed in accordance with the invention, i.e. which include different cross sectional configurations and optionally different sizes within different layers, have been found to decrease the tendency of fibers within nonwovens to nest together into tight bundles. Such nesting is readily observed in many conventional nonwoven fabrics. Due to the decrease in nesting, the layer constructions of the present invention lead to the formation of thicker fabrics in comparison to comparable conventional nonwovens. The nonwoven fabrics of the invention are further characterized by a greater openness in comparison to conventional nonwovens, leading to lower induced pressure drops and higher air permeabilities. The nonwoven fabrics of the invention are also stiffer than comparable conventional spunbonded webs. The nonwoven fabrics of the invention generally provide a stiff open scrim that has a very low pressure drop and improved dust holding capacity.

The nonwoven fabrics of the invention may be advantageously used to form filtration media, particularly pleated filtration media. For example, the nonwoven fabrics of the invention may be incorporated as a pleat support into pleated filtration media, along with other layers that provide further filtration. For example, the nonwoven fabrics of the invention may be used in pleated filters along with a layer of finer, more fragile fibers to increase the filtration efficiency of the resulting product. In addition to pleated filters, alternative filtration applications include use as a dust holding layer and a functional particle impregnation layer.

The nonwoven fabrics of the invention may also be suitable for non-filtration applications, as well. For example, the nonwoven fabrics of the invention may be beneficially employed in any application in which a nonwoven fabric having superior air permeability and low pressure drop is required.

The following examples are provided for purposes of further illustrating specific embodiments of the invention. It should be understood, however, that the invention is not limited to the specific details given in the examples.

EXAMPLES

A series of exemplary spunbonded nonwoven fabric in accordance with the invention were prepared from polyester continuous filaments. Examples 1 through 7 each had a four layer construction in which the inner two layers were formed from quadralobal filaments and the two outer layers were formed from trilobal filament. Both the trilobal and quadralobal filaments used in Examples 1, 3, 5, 6 and 7 had finenesses of about 12 dpf (correlating to a fiber diameter of about 35 microns). The trilobal filaments used in Examples 2 and 4 had a fineness of about 6 dpf (correlating to a fiber diameter of about 35 microns), while the quadralobal filaments had a fineness of about 12 dpf (correlating to a fiber diameter of about 25 microns). Each of the examples was subsequently tested for filtration performance.

Comparative examples were tested for filtration performance, as well. Comparative Example 1 was formed from commercially available spunbonded web produced by Reemay Inc. of Old Hickory, Tenn. as style 2033. Comparative Example 2 was formed from commercially available spunbonded web produced by Reemay Inc. of Old Hickory, Tenn. as style 2200. Comparative Example 3 was formed from commercially available spunbonded web produced by Reemay Inc. of Old Hickory, Tenn. as style 2295. Comparative Example 4 was formed from a commercially web known as Meltfab 80. Comparative Example 5 was formed from commercially available web known as Meltfab 90. Comparative Example 6 was formed from a commercially available wet laid nonwoven produced by BBA Nonwovens under the name of Confil 80. Comparative Example 7 was formed from a commercially available wet laid nonwoven produced by BBA Nonwovens under the name Confil 70. Comparative Examples 8 and 9 were developmental samples.

The filtration performance of the examples of the invention and comparative examples is provided in Table 1, attached. As shown in Table 1, nonwoven fabrics formed in accordance with the invention provide a beneficial balance of low pressure drop, improved dust holding ability, and increased air permeability. The beneficial properties of the present invention are particularly emphasized by a comparison between Examples 2 and 3 with Comparative Example 1, which indicates that fabric fabrics formed in accordance with the invention have greater stiffness, lower pressure drop, increased air permeability and greater particulate holding characteristics in comparison to conventional nonwoven constructions.

While particular embodiments of the invention have been described, it will be understood, of course, the invention is not limited thereto since modifications may be made by those skilled in the art, particularly in light of the foregoing teachings. It is therefore, contemplated by the appended claims to cover any such modifications that incorporate those features of these improvements in the true spirit and scope of the invention.

TABLE 1

FILTRATION PERFORMANCE OF VARIOUS SAMPLES

| Sample Identification | Basis Wt (oz/yd$^2$) | Caliper (mils) | Fiber Size (um) | Air Perm (cfm) | MD Gurley (gms) | CD Gurley (cms) | ΔP | Eff. @ 4.0–5.5 Microns | Dust Holding (Wt. gain, gms) |
|---|---|---|---|---|---|---|---|---|---|
| Comparative Example 1 | 3.0 | 17 | 20 | 258 | 413 | 260 | 0.17 | 64.88 | 0.33 |
| Comparative Example 2 | 1.0 | 8 | 15 | 663 | | | 0.05 | 28.03 | 0.66 |
| Comparative Example 3 | 2.95 | 18 | 15 | 250 | 371 | 331 | 0.17 | 63.07 | 0.89 |
| Comparative Example 4 | 2.36 | 23.9 | 45 | 690 | 306 | 283 | 0.02 | 20.29 | 1.91 |
| Comparative Example 5 | 2.7 | | 45 | | | | 0.03 | 27.27 | 1.79 |
| Comparative Example 6 | 80[1] | 28.5 | 12/39 | 630 | 310 | 220 | 0.04 | 32.32 | 1.72 |
| Comparative Example 7 | 70[1] | 23 | 12/39 | 695 | 307 | 160 | 0.04 | 26.57 | 1.57 |
| Comparative Example 8 | 60[1] | 23 | | 740 | 265 | 165 | | | |
| Comparative Example 9 | 74[1] | 25 | | 661 | 332 | 201 | | | |
| Example 1 | 4 | 27.6 | 35 | 360 | 1072 | 913 | 0.1 | 53.32 | 1.78 |
| Example 2 | 3 | 21.8 | 25/35 | 413 | 640 | 395 | 0.08 | 38.84 | 2.43 |
| Example 3 | 3 | 20.9 | 35 | 419 | 440 | 428 | 0.06 | 34.82 | 2.29 |
| Example 4 | 2 | 14.1 | 25/35 | 558 | 130 | 136 | 0.05 | 30.63 | 2.35 |
| Example 5 | 2 | 15.7 | 35 | 597 | 166 | 197 | 0.04 | 22.65 | 2.02 |
| Example 6 | 1.5 | 11 | 35 | 744 | 61 | 54 | 0.03 | 20.52 | 1.72 |
| Example 7 | 1.0 | 8.7 | 35 | 957 | 15 | 19 | 0.01 | 4.41 | 4.2 |

[1]Basis weight units are g/m$^2$ rather than oz/yd$^2$.

That which is claimed:

1. A nonwoven fabric comprising;
   (a) a first air permeable layer of substantially continuous filaments of a first non-circular cross section defining a first outer surface of the fabric;
   (b) a second air permeable layer of substantially continuous filaments of trilobal cross section defining an opposite outer surface of the fabric; and
   (c) at least one air permeable intermediate layer of substantially continuous filaments of a second non-circular cross section disposed between said first and second layers, and wherein said second non-circular cross section is different from said first non-circular cross section.

2. A nonwoven fabric according to claim 1 wherein the continuous filaments of a first non-circular cross section and the continuous filaments of a second non-circular cross section are polyester filaments and are bonded to one another at filament cross over points.

3. A nonwoven fabric according to claim 1 wherein the filaments of each of said layers have a denier per filament in the range from about 3 to 24.

4. A nonwoven fabric according to claim 3, wherein the filaments in one of said layers have a denier per filament different from the filaments in another one of said layers.

5. A nonwoven fabric according to claim 4, wherein the filaments in said first layer have a denier per filament smaller than the filaments of said at least one intermediate layer, and the filaments in said second layer have a denier per filament greater that the filaments of said at least one intermediate layer.

6. A composite nonwoven fabric comprising a first air permeable nonwoven layer comprised of fibers having a trilobal cross section; said first nonwoven layer defining one of the outer surfaces of the composite fabric, a second air permeable nonwoven layer located adjacent to said first layer and comprised of fibers having a cross section which defines four or more lobes, and a third nonwoven layer located opposite said first layer and adjacent to said second nonwoven layer and defining an opposite outer surface of the composite nonwoven fabric, the fibers of said third nonwoven layer having a non-circular cross section that is different from the fibers of said second nonwoven layer.

7. A nonwoven fabric according to claim 6, wherein the fibers of said first nonwoven layer are of a different size from the fibers of said second nonwoven layer.

8. A nonwoven fabric according to claim 6 wherein said first and second nonwoven layers are each spunbond nonwoven fabrics formed of continuous filaments.

9. A nonwoven fabric according to claim 8 wherein said spunbond fabrics have a basis weight ranging from about 0.2 to 8 oz./square yd.

10. A nonwoven fabric according to claim 6, wherein the fibers of each of said layers have a denier per filament in the range from about 3 to 24.

11. A nonwoven fabric according to claim 6, wherein the fibers of said third nonwoven layer have a trilobal cross section.

12. A pleated filtration medium fanned from the composite nonwoven fabric of claim 6.

13. A nonwoven fabric comprising:
(a) a first air permeable layer of substantially continuous filaments of a first non-circular cross section defining a first outer surface of the fabric;
(b) a second air permeable layer of substantially continuous filaments defining an A opposite outer surface of the fabric; and
(c) at least one air permeable intermediate layer of substantially continuous filaments of a second non-circular cross section disposed between said first and second layers,
wherein the filaments of said first and second layers have a trilobal cross section and the filaments of said at least one intermediate layer have four lobes.

14. A nonwoven fabric comprising:
(a) a first air permeable layer of substantially continuous polyester filaments of a trilobal cross section defining a first outer surface of the fabric;
(b) a second air permeable layer of substantially continuous polyester filaments of a trilobal cross section defining an opposite outer surface of the fabric; and
(c) at least one air permeable intermediate layer of substantially continuous polyester filaments of a quad-lobal cross section disposed between said first and second layers, and wherein the filaments of said first, second and intermediate layers are bonded at filament cross over points for form a strong, coherent, unitary nonwoven fabric.

* * * * *

UNITED STATES PATENT AND TRADEMARK OFFICE
CERTIFICATE OF CORRECTION

PATENT NO. : 7,153,793 B2
APPLICATION NO. : 10/725222
DATED : December 26, 2006
INVENTOR(S) : Willis et al.

It is certified that error appears in the above-identified patent and that said Letters Patent is hereby corrected as shown below:

Column 10,

Line 7, "fanned" should read --formed--.

Signed and Sealed this

Third Day of April, 2007

JON W. DUDAS
*Director of the United States Patent and Trademark Office*